A. WILTZ.
EYEGLASSES.
APPLICATION FILED NOV. 20, 1908.
951,714.
Patented Mar. 8, 1910.
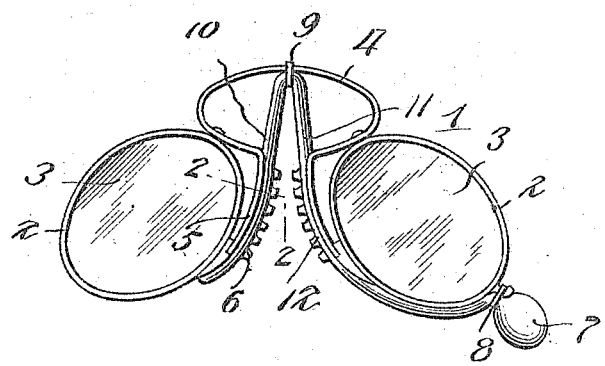
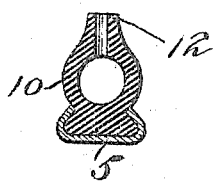
Witnesses
Hugh H. Ott
Irving J. King
Inventor
Albert Wiltz
By Victor J. Evans
Attorney

UNITED STATES PATENT OFFICE.

ALBERT WILTZ, OF CHEWELAH, WASHINGTON.

EYEGLASSES.

951,714.   Specification of Letters Patent.   Patented Mar. 8, 1910.

Application filed November 20, 1908. Serial No. 463,672.

*To all whom it may concern:*

Be it known that I, ALBERT WILTZ, a citizen of the United States, residing at Chewelah, in the county of Stevens and State of Washington, have invented new and useful Improvements in Eyeglasses, of which the following is a specification.

This invention relates to improvements in eye glasses, and the primary object of the invention is the provision of a nose grip the gripping action of which is derived from the use of suction.

Another object of the invention is the provision of a device of this character which is simple in construction, efficient in practice and can be manufactured and sold at a comparatively low cost.

With the above and other objects in view the invention consists in the details of construction and in the arrangement and combination of parts to be hereinafter more fully described and claimed.

In the accompanying drawing, Figure 1 is a plan view of a pair of eye glasses, showing my improved nose grip applied thereto, and Fig. 2 is a sectional view taken on line 2—2 of Fig. 1 of the drawing.

Referring to the drawing for a more particular description of the same, numeral 1 designates a pair of eye glasses comprising frames 2, and having mounted therein lenses 3. The said frames are connected together by means of a bridge 4. The bridge 4 is provided with a pair of relatively spaced, depending, diverging, channeled arms 5. Secured to the channeled arms 5 and seated therein, is an elastic nose grip 6 having one end closed, while the other end is formed with a bulb 7 for expelling air from the said elastic nose grip, which will be described further on. The said grip 6 is connected to the lower end of one of the frames 2 by means of the securing member 8, and to the top portion of the bridge 4, by means of the securing member 9, and when thus assembled the grip 6 presents a pair of parallel spaced nose gripping members 10 and 11, the opposing faces of the members being formed with apertured projections 12. Before applying the glasses, the air is expelled from the nose grip by pressing the bulb 7; after the glasses have been applied, pressure on the bulb is released, whereupon, a suction will be produced in the nose grip, such suction securing the glasses in applied position against accidental displacement.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claims.

Having thus described my invention what is claimed as new is:—

1. A nose grip for eye glasses comprising hollow flexible members having openings in their opposing surfaces, and means by which air may be expelled from the members.

2. A nose grip for eye glasses comprising a hollow flexible member having one end closed, projections having openings, and means by which air may be expelled through the projections.

3. A nose grip for eye glasses comprising a hollow flexible member having one end closed, projections having openings, and means disposed on the other end of the member by which air may be expelled from the projections.

4. A nose grip for eye glasses comprising hollow flexible members having openings in their opposing surfaces, and a bulb for expelling air through the opening.

5. In combination with a pair of eye glasses comprising frames, a bridge connecting the frames and having channeled arms, a flexible grip seated in said channels and having openings in the opposing surfaces thereof, and means by which air may be expelled through the openings.

6. A nose grip for eye glasses comprising hollow apertured members, and means by which air may be expelled from the members.

In testimony whereof I affix my signature in presence of two witnesses.

ALBERT WILTZ.

Witnesses:
C. T. RIGG,
J. C. RIGG.